UNITED STATES PATENT OFFICE.

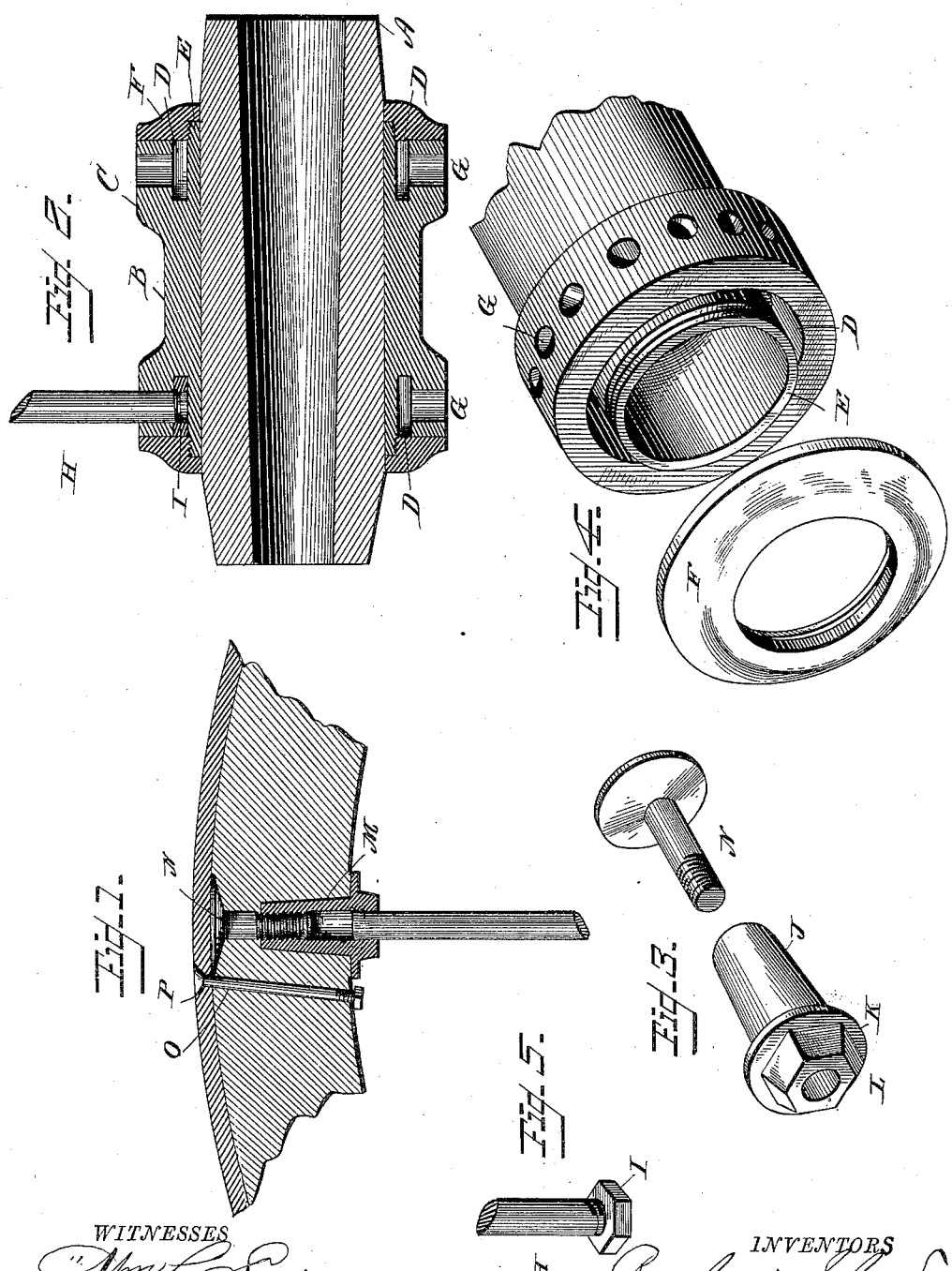

BARNHARD SCHAD AND GEORGE HOFFMAN, OF LOCKPORT, NEW YORK, ASSIGNORS, BY DIRECT AND MESNE ASSIGNMENTS, TO LOUISA JANE HOFFMAN, OF SAME PLACE, AND JOHN P. SCHAD, OF BATAVIA, NEW YORK.

VEHICLE-WHEEL.

SPECIFICATION forming part of Letters Patent No. 309,566, dated December 23, 1884.

Application filed September 2, 1884. (No model.)

*To all whom it may concern:*

Be it known that we, BARNHARD SCHAD and GEORGE HOFFMAN, citizens of the United States, residing at the city of Lockport, in the county of Niagara and State of New York, have invented certain new and useful Improvements in Vehicle-Wheels; and we do hereby declare the following to be a full, clear, and exact description of the invention, such as will enable others skilled in the art to which it appertains to make and use the same, reference being had to the accompanying drawings, forming part of the same.

Figure 1 is a view partly in section of part of a felly, tire, and spoke of a wheel with our improvements applied thereto. Fig. 2 is a section through a hub made according to the improvement with one spoke in place. Fig. 3 is a perspective of the sleeve and bolt detached from other parts. Fig. 4 is a perspective of part of the hub with its cap detached. Fig. 5 is a view of part of a spoke with its nut applied.

Our invention relates to wheels for vehicles, and has for its object to so provide for the attachment of the spokes to the hub and the felly that they can be removed without taking off the tire, and also to obtain such elasticity in the wheel that the strain on the parts will to a considerable extent be relieved; and to those ends the invention consists in the construction and also in the combination of parts, hereinafter particularly described and specified.

In the drawings, the letter A designates the portion of the hub through which the axle passes, and which is made of wood, and to the exterior thereof there is closely and tightly fitted and secured a malleable-iron casting, B, formed at opposite ends with a band or rim, C, hollowed out or recessed lengthwise of the casting, so as to form a chamber, D, for the reception of a nut, and also formed with a screw-threaded flange, E, projecting beyond the end of the casting to receive a cap, F; and, further, formed with holes G, extending through the rim C into the chamber or recess D, for the passage therethrough of the spokes H.

Each spoke is secured in the casting B by a nut, I, screwed onto their ends, the nuts being applied by inserting them in the chamber or recess D and then passing the threaded end of the spoke through the hole G, and either turning the spoke or the nut while one or the other is firmly held against turning. The hub end of the spoke is thus firmly secured to the casting, and the cap F is next screwed onto the flange E, to prevent mud or other matter from filling the recess, and also to form a finish to the end of the casting and to prevent the nut from turning and keep the spoke from rattling as it bears against the nut. The other end of the spoke is secured at the felly by means of a threaded sleeve, J, provided with a washer or collar, K, and a nut, L, preferably formed integral therewith. This sleeve fits in a socket, M, formed in the felly, and is held therein by a threaded bolt, N, which engages with the threads of the sleeve, and is formed with a rivet-head which fits into a correspondingly-shaped depression in the tire-face of the felly. This sleeve is first slipped over the felly end of the spoke before the hub end is secured in place, and is then slipped up into the socket in the felly, and then screwed up so as to make a close and tight connection with the threaded end of the bolt N, the washer or collar K fitting jam against the inside face of the felly, so as to cover the socket and form a brace between the felly and other parts. The tire is next applied, and bears against the head of the bolt N, and is held to its place by the tire-bolt P, which may be made to bear against or pass through a part of the bolt's head, so as to prevent the latter from turning. When the parts are adjusted to their places, there will be space enough between the end of the spoke and the end of the bolt N to prevent the two ends from meeting, and thus afford some elasticity to the wheel at such points. The ends of the spokes in an upright position in the revolution of the wheel will not drop or fall, because the hub will be suspended from the felly by the spokes, which are at an angle to a line drawn vertically through the center of the wheel, and thus is formed a suspension-wheel, so that as the result of the two features there is obtained an elastic suspension-wheel.

In order to remove any one or more spokes without taking off the tire, the sleeve J and nut L are first detached and separated from the threaded bolt and felly, and then the spoke is released from the nut at the other end either by turning the spoke or removing the cap F and then unscrewing the nut I.

The parts can be made at little expense and sold separately, and when brought together they form a strong elastic suspension-wheel.

Having described our invention, and set forth its merits, what we claim is—

1. The combination of the hub B, formed at opposite ends with the raised band C, having spoke-holes G therein, and a chamber, D, for the reception of nuts, the portion of the hub forming the base of said chamber being extended to form a threaded flange, E, the wooden portion A surrounded by the hub B, and constituting a part thereof, and the screw-cap F, formed with a shoulder, as shown, said shoulder being threaded to engage with the threads of said flange E, and said cap being adapted to fit against the end of said flange, raised band, and nut, all substantially as and for the purpose set forth.

2. The combination, with the felly and its tire, of the sleeve fitting in a socket in the felly, the nut for adjusting said sleeve, and the bolt passing through the felly into said sleeve, substantially as described.

3. The combination, with the felly and its tire, of the sleeve fitting in a socket in the felly, the nut for adjusting the said sleeve, the bolt passing through the felly beneath the tire into said sleeve, and the spoke entering said nut, substantially as described.

4. The combination, with the hub and felly, of a sleeve fitting in a socket in the felly, a threaded bolt passed through the felly beneath the tire thereof into said sleeve, a nut for adjusting said sleeve, and a spoke passed from the hub through said nut and terminating at a point distant from the end of said bolt, so as to leave a space between the bolt and spoke, substantially as described.

5. The wheel composed of the hub-casting formed with recesses for the reception of nuts, nuts within said recesses, caps to hold the nuts therein, the felly, the threaded bolts passed through the same, the sleeves entering sockets in the felly and receiving said bolts and provided with nuts for operating the same, and the spokes passing through the casting and engaging with the nuts at one end and through the sleeve-nuts at the opposite ends and terminating at a point distant from the ends of said threaded bolts, substantially as and for the purposes described.

In testimony whereof we have affixed our signatures in presence of two witnesses.

BARNHARD SCHAD.
GEORGE HOFFMAN.

Witnesses:
R. M. RANDOLPH,
EASTON ELLIOTT.